United States Patent
Korn et al.

(10) Patent No.: US 8,977,987 B1
(45) Date of Patent: Mar. 10, 2015

(54) MOTION-BASED INTERFACE CONTROL ON COMPUTING DEVICE

(75) Inventors: Jeffrey Korn, New York, NY (US); David Held, Brooklyn, NY (US)

(73) Assignee: Google Inc., Mountain View, CA (US)

(*) Notice: Subject to any disclaimer, the term of this patent is extended or adjusted under 35 U.S.C. 154(b) by 632 days.

(21) Appl. No.: 12/815,096

(22) Filed: Jun. 14, 2010

(51) Int. Cl.
*G06F 3/00* (2006.01)

(52) U.S. Cl.
USPC ........... 715/863; 715/702; 715/802; 715/829; 715/831; 715/864

(58) Field of Classification Search
CPC ...... G06F 3/016; G06F 3/0481; G06F 3/0484
USPC .................. 715/864, 802, 829, 831, 863, 702
See application file for complete search history.

(56) References Cited

U.S. PATENT DOCUMENTS

| | | | |
|---|---|---|---|
| 5,322,441 A | 6/1994 | Lewis et al. | |
| 5,602,566 A | 2/1997 | Motosyuku et al. | |
| 5,745,116 A | 4/1998 | Pisutha-Arnond | |
| 5,841,994 A | 11/1998 | Boesch et al. | |
| 5,973,669 A | 10/1999 | Fitzmaurice et al. | |
| 6,009,210 A | 12/1999 | Kang | |
| 6,115,028 A | 9/2000 | Balakrishnan et al. | |
| 6,191,842 B1 | 2/2001 | Navarro | |
| 6,201,554 B1* | 3/2001 | Lands ........................... 345/169 | |
| 6,226,035 B1 | 5/2001 | Korein et al. | |
| 6,249,284 B1 | 6/2001 | Bogdan | |
| 6,288,704 B1 | 9/2001 | Flack et al. | |
| 6,798,429 B2 | 9/2004 | Bradski et al. | |
| 6,937,272 B1 | 8/2005 | Dance | |
| 7,176,887 B2 | 2/2007 | Marvit et al. | |
| 7,180,500 B2 | 2/2007 | Marvit et al. | |
| 7,301,528 B2 | 11/2007 | Marvit et al. | |
| 7,671,845 B2 | 3/2010 | Keely | |
| 7,688,306 B2 | 3/2010 | Wehrenberg et al. | |
| 2002/0167699 A1 | 11/2002 | Verplaetse et al. | |
| 2005/0174324 A1 | 8/2005 | Liberty et al. | |
| 2006/0136246 A1* | 6/2006 | Tu ..................................... 705/1 |
| 2006/0227030 A1 | 10/2006 | Clifford et al. | |
| 2007/0136681 A1* | 6/2007 | Miller ........................... 715/782 |
| 2007/0268246 A1* | 11/2007 | Hyatt ............................ 345/156 |
| 2008/0030464 A1 | 2/2008 | Sohm et al. | |
| 2008/0192020 A1* | 8/2008 | Kang et al. .................... 345/173 |
| 2009/0292671 A1* | 11/2009 | Ramig et al. ...................... 707/3 |
| 2009/0303204 A1* | 12/2009 | Nasiri et al. .................. 345/184 |

(Continued)

OTHER PUBLICATIONS

Fitzmaurice, George W. "Situated Information Spaces and Spatially Aware Palmtop Computers." Communications of the ACM; Jul. 1995, vol. 36, No. 7.

(Continued)

*Primary Examiner* — Ryan Pitaro
(74) *Attorney, Agent, or Firm* — Fish & Richardson P.C.

(57) ABSTRACT

A computer-implemented user interface method include displaying an image on a graphical user interface of a mobile computing device, receiving a first user input indicating an intent to perform a zooming operation on the graphical user interface, transitioning the mobile computing device into a zooming mode in response to the user input, sensing motion of the mobile computing device in one or more of a plurality of directions, correlating the sensed motion in one or more of a plurality of directions with either a zooming in or a zooming out zooming direction, and changing a zoom level of the display of the image on the graphical user interface to correspond to the correlated zooming direction.

19 Claims, 6 Drawing Sheets

(56) References Cited

U.S. PATENT DOCUMENTS

| | | | |
|---|---|---|---|
| 2009/0312064 A1* | 12/2009 | Aida et al. | 455/566 |
| 2010/0045666 A1* | 2/2010 | Kornmann et al. | 345/419 |
| 2010/0050134 A1* | 2/2010 | Clarkson | 715/863 |
| 2010/0053219 A1* | 3/2010 | Kornmann | 345/653 |
| 2010/0125816 A1* | 5/2010 | Bezos | 715/863 |
| 2010/0125818 A1* | 5/2010 | Vaananen et al. | 715/864 |
| 2010/0250816 A1* | 9/2010 | Collopy et al. | 710/303 |
| 2010/0257438 A1* | 10/2010 | Becerra et al. | 715/204 |
| 2010/0315439 A1 | 12/2010 | Huang et al. | |
| 2011/0087963 A1* | 4/2011 | Brisebois et al. | 715/702 |
| 2011/0102455 A1 | 5/2011 | Temple | |
| 2011/0115822 A1* | 5/2011 | Bae | 345/661 |
| 2011/0119621 A1* | 5/2011 | Cho et al. | 715/788 |
| 2011/0252358 A1* | 10/2011 | Wilson et al. | 715/781 |
| 2011/0271227 A1* | 11/2011 | Takahashi | 715/800 |

OTHER PUBLICATIONS

Koved, Larry and Ted Selker. "Room With a View (RWAV): A Metaphor for Interactive Computing." IBM Research; T.J. Watson Research Center; Yorktown Heights, NY; Sep. 1990.

Rekimoto, Jon. "Tilting Operations for Small Screen Interfaces (Tech Note)." Sony Computer Science Laboratory Inc.; Tokyo, Japan, 1996.

* cited by examiner

MOTION-BASED INTERFACE CONTROL ON COMPUTING DEVICE

TECHNICAL FIELD

This document relates to user interfaces for computing devices such as mobile devices in the form of smart phones.

BACKGROUND

Mobile computing continues to grow quickly as mobile devices, such as smart phones, add more power and more features. Users of such devices may now access various services on the internet, such as mapping applications, electronic mail, text messaging, various telephone services, general web browsing, music and video viewing, and similar such services. The small size of mobile devices may make it difficult to interact with such services, for example, because traditional mouse input is generally not practical with most mobile devices and the same is true for full-size QWERTY keyboards.

Many mobile devices now employ touchscreen interfaces as their main input mechanism. Such interfaces generally include an active display device and a touch sensitive overlay (e.g., a capacitive device that sense the contact or nearby presence of a user's finger). Mobile devices may also include a number of other sensors that can be used as input mechanisms, such as magnetometers (compasses) and accelerometers. For example, accelerometers can be used as input for games that are played on a device.

SUMMARY

This document describes systems and techniques that a user may employ in order to zoom or otherwise change a user interface using motion of a mobile computing device such as a smart phone. In general, an application or operating system on a mobile device may determine, using for example an accelerometer in the device, that a user has tilted the device, and may zoom an element on the device's graphical display (such as a photograph, other image, or map) in response to the tilting, where the degree or speed of the zooming may be proportional to the degree of tilting. Other motion may additionally or alternatively be sensed and used to control the displayed information in similar manners, such as lateral or up-and-down motion of the mobile device.

Also, such response by a device may occur only after a user has activated a particular control, such as by holding down a zoom icon on the graphical display itself or beside the graphical display while tilting or otherwise moving the device, or by the user holding down on the graphical element at a location that defines the center of the zooming operation. Such zooming operation may also be instigated by motion of the device that indicates that the user of the device is either lifting the device (e.g., zoom in) or dropping it (e.g., zoom out).

The zooming motions may also be supplemented by motion input for affecting panning and orientation (e.g., rotation of a graphical item on a device display) on a device. For example, a user may move a finger from pressing on a zoom icon to pressing on a pan icon (either on or off the display itself), and subsequent tilting of the device may result in corresponding panning of an image on the graphical user interface. For example, if the user dips the right side of the device slightly downward, the view on the display may be panned slightly to the right, and vice-versa.

In certain embodiments, the features discussed here may provide one or more advantages. For example, a user can enter commands into a device intuitively without having to clutter a display of the device with various controls for providing input. The user can also provide input proportionately, so as to zoom more quickly or more completely by tilting his or her device more completely, which may also provide for more intuitive input. Such features may also be provided as part of an input method editor (IME) for a device so that they are available to any application on the device that wants to perform operations such as zooming, panning, and changing orientation, through a simple application programming interface (API). In this manner, a user may obtain a better experience with a device, may purchase similar types of devices in the future, and may tell acquaintances about the benefits of the device so that they purchase it and in turn have superior experiences.

In one implementation, a computer-implemented user interface method is discussed. The method comprises displaying an image on a graphical user interface of a mobile computing device; receiving a first user input indicating an intent to perform a zooming operation on the graphical user interface; transitioning the mobile computing device into a zooming mode in response to the user input; sensing motion of the mobile computing device in one or more of a plurality of directions; correlating the sensed motion in one or more of a plurality of directions with either a zooming in or a zooming out direction; and changing a zoom level of the display of the image on the graphical user interface to correspond to the correlated zooming direction. The motion can be sensed by using an accelerometer in the mobile computing device. Also, the method can additionally include receiving a second user input indicating an intent to perform a panning operation on the graphical user interface, transitioning the mobile device into a panning mode in response to the second user input, correlating motion of the device with one or more panning directions, and panning the image in a direction of the one or more correlated panning directions.

In some aspects, the method also comprises providing a panning icon and a zooming icon on the graphical user interface, and wherein receiving a user input indicating an intent to perform a zooming function comprises receiving a user selection of the zooming icon and receiving an input of a user intent to perform a panning operation comprises receiving a user selection of the panning icon. The panning mode can be maintained only while the user presses on the panning icon, and the zooming mode can be maintained only while the user presses on the zooming icon. In addition, the image can comprise a geographical map. It can also comprise a list of files, sensed tilting of the device in a direction that is aligned with the list can cause the list to scroll, and sensed motion of the device in a direction that is not aligned with the list can cause the list to zoom. Moreover, zooming of the list can comprise shifting from a listing of single alphanumeric characters to a listing of each item in the list in an alphanumeric order.

In yet other aspects, the sensed motion comprises tilting of the mobile computing device about an axis of the mobile computing device, or lateral motion of the mobile computing device and the zooming occurs in a direction that corresponds to a direction of the lateral motion. Moreover, the image may comprises a rendered web page, or a digital image displayed in an image viewing application that is executing on the mobile computing device.

In another implementation, an article comprising a computer-readable data storage medium storing program code is disclosed. The code is operable to cause one or more machines to perform certain operations. The operations include displaying on a electronic touch screen a visual representation of a virtual space at a first zoom level, sensing, with an accelerometer in the device, that the device has been tilted, determining a degree of tilt of the computing device, and changing the zoom level of the device based on the determined degree of tilt. The operations can also include receiving a user input indicating an intent to perform a panning operation on the mobile device, transitioning the mobile device into a panning mode in response to the user input, correlating motion of the device with one or more panning directions, and panning the image in a direction of the one or more correlated panning directions.

In some aspects, the operations further comprise providing a panning icon and a zooming icon on a display of the mobile device, and wherein receiving a user input indicating an intent to perform a zooming function comprises receiving a user selection of the zooming icon and receiving an input of a user intent to perform a panning operation comprises receiving a user selection of the panning icon. In addition, the panning mode can be maintained only while the user presses on the panning icon, and the zooming mode is maintained only while the user presses on the zooming icon. And the visual representation of the virtual space can comprise a list of files, sensed tilting of the device in a direction that is aligned with the list can cause the list to scroll, and sensed motion of the device in a direction that is not aligned with the list can cause the list to zoom. Moreover, zooming of the list can comprise shifting from a listing of single alphanumeric characters to a listing of each item in the list in an alphanumeric order.

In yet another implementation, a mobile computing device is disclosed that includes a touch input manager to receive and interpret user inputs on a touch input device of a computing device, one or more computing applications stored on the mobile computing device, and an input method editor programmed to receive information from motion sensors on the device and to provide data relating to the received information to a plurality of different applications that include the one or more applications, wherein the one or more applications are programmed to convert the data from the input method editor into commands for changing zoom levels on a display of the computing device. The device can also include an application programmed to obtain one or more applications from an in-line application store, wherein the obtained applications include interfaces for interacting with the input method editor.

In another implementations, a mobile computing device comprises a touchscreen input manager to receive and interpret user inputs on a touchscreen of a computing device, one or more computing applications, and means for providing zooming changes to data on a display of the device in response to information received form motion detectors mounted in the device.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for receiving motion-based user input on a mobile computing device, wherein motion of the device causes zooming actions or other such changes in graphical items displayed on a display to be provided by the device. For example, dipping one side of a device relative to the other side is motion that can be sensed by an accelerometer in the device, and can be provided as an input to an application directly, or to an IME where it can be translated into a value or values that are usable to the application. Particular degrees of tilt may be translated into indexed values to be provided for use by an application, such as by translating degrees of tilt into discrete button presses or levels of finger pressure that would have otherwise been received on an input mechanisms such as a D-pad. Thus, for example, tilting a device by 30 degrees may be the equivalent of zooming by pressing one side of a D-pad three times, or another appropriate amount, or in pressing a screen with intermediate level of pressure (which would affect the speed that zooming or other changes in a displayed object occur). Also, certain applications, such as mapping applications may have discrete zoom levels in the first place, so that the degree of tilt translates into a certain number of such discrete zoom levels, or speed through which those zoom levels are cycled.

Figure 1A:
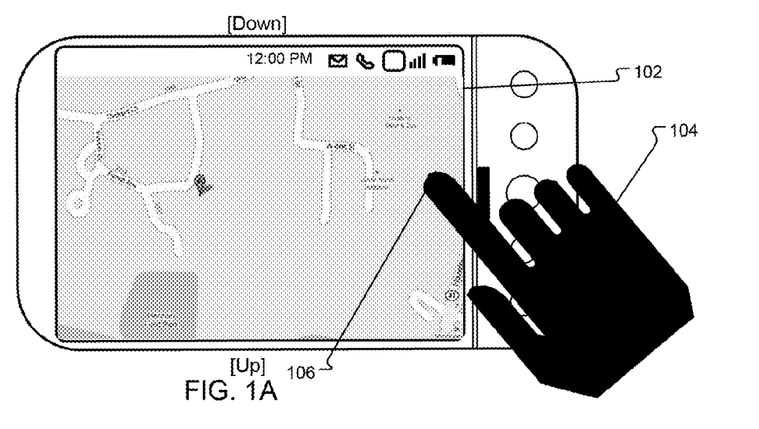
FIGS. 1A-1C show example interactions with a mobile device using motion-based input.
Figure 1B:
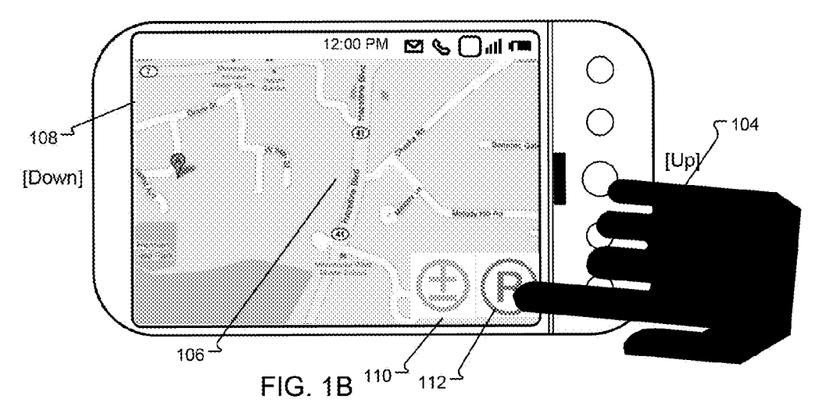
Figure 1C:
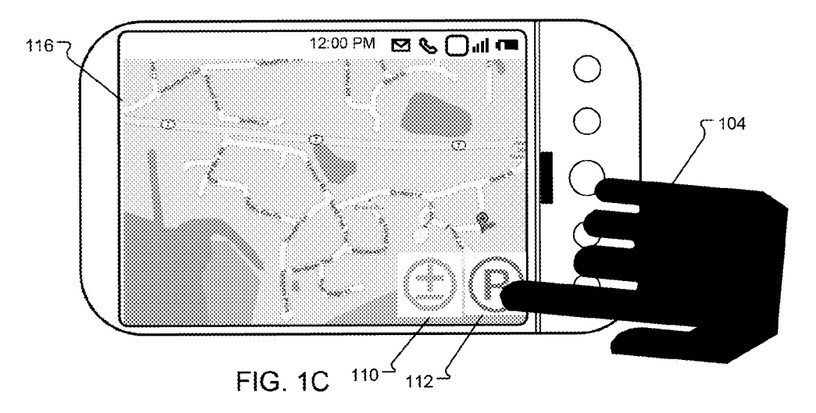

The user may indicate in various manners an intent to end a mode in which the motion of the device is used to provide certain changes to a displayed object. For example, where holding a icon down is used to enter the mode, release of the icon can cause the mode to be exited. Also, pressing a icon may cause the mode to be entered, and pressing it again may cause the mode to be exited. As another example, the motion-controlled mode may be exited when a certain motion is sensed such as a sudden jerked motion of a device. The mode may also be entered only for a single input, such that a particular motion must be repeated for each step in a zooming process, so as to ratchet in on a point on the display FIG. 1 shows example interactions with a mobile device using motion-based input. In general, four different displays 102, 108, 116 on the device arranged chronologically are shown to provide examples demonstrating how the techniques described here can be implemented. Each of the displays 102, 108, 116 are shown in a mobile device having a touchscreen graphical user interface, where the device may be loaded with a number of computer applications, including a mapping application.

Display 102 shows such an example of a mapping application being executed on the device. The mapping application may be executed from a browser or from a dedicated application on the device that accesses remote server-based mapping data and search services, such as GOOGLE MAPS. Here, the map is zoomed to a fairly close level on a residential area with a park to the South edge of the display 102 and a highway to the East edge of the display 102.

In this example, a user's hand 104 is shown contacting the touchscreen for the display 102 at a location 106 near the East edge. Such contact with the surface of the map may shift the device into a mode in which various inputs will have different effects than when the user is not contacting the display in this manner. For example, the user may slide his or her finger to pan the display. In addition, although not visible in the figure, the device may start accepting motion-based input for zooming of the display 102.

To that end, bracketed labels of [Down] and [Up] are shown above and below the display 102, respectively, to indicate that the user is tipping the device forward so that the top edge of the device (near the Northern part of the map) is being pushed downward toward the ground relative to the bottom edge (near the South side of the map). The zooming may be smooth with the tilting (so that each minute level of tilt appears to the user to result in an equivalent level of zoom) or may be discrete, where the zoom level jumps from one level to a substantially closer or farther level, which is a zooming approach that is common with mapping applications, where the maps may be represented by separate sets of image tiles that are pre-scaled to particular zoom levels. Thus, for example, when a user first tilts the device, no zooming may occur, but when the level of tilt reaches, e.g., 10 degrees, the map may zoom in or out by a discrete level that is a preexisting part of the mapping service. The map may then zoom another discrete level when the amount of tilt hits 20 degrees. Also, the length of time during which the device is moved (e.g., held at a certain tilted angle that exceeds some minimum threshold, so as to filter out minimal motion that is not intended to invoke the zooming mode) can affect the degree of zoom, so that the display starts zooming in a particular direction when the device is tilted, and keeps zooming until the device is un-tilted.

The center of the zooming may be set as the center of the display 102, the position at which the user's finger contacts the display 102, or another appropriate location. Thus, for example, if a user sees a point on a map that is of particular interest to them, they may simply place their finger on the point and then tilt their device forward (or another direction) to bring that point more closely into view, where more detail about the point can be shown. Also, supplemental meta data about a point that is contacted in a graphical item may be shown. For example, if the user contacts an address, the name and telephone number for the residents of the address may be shown in a pop-up box as the user manipulates the graphical item (e.g., by zooming in on it). Meta data may also be displayed for a geographic venue (e.g., a store) or other object that is closest to the center of a screen, so that a user can, for example, pan a coffee shop to the middle of a screen on a map, and contact information for the coffee shop may be displayed automatically on the device without the user having to explicitly call for such information.

Also, as a user zooms in, ambiguity about what the user wants to focus on may be resolved, and the meta data may then be updated to reflect only the address or other object that is now clearly the user's focus. For example, at a first zoom level, a user's finger may cover an entire block, but after the user has zoomed in, it may become clear that the user intends to select a particular coffee shop on the block, and the displayed meta data may be updated to show the telephone number for the coffee shop. The user may then conveniently place a call to that number, such as by tapping the number on the display 102, by shaking their device quickly, or by raising the device to their ear (an action that may be sensed by the device in various ways), among other things.

The user may also pan and zoom interactively, by dragging their finger while tipping the device one way or the other. In this manner, the user may more readily find the information they are seeking without having to go through a number of discrete, linear steps to get there. Such conjoined activity may also be more intuitive for the user.

When the user is done panning (e.g., by sliding a finger or tilting the device or other appropriate gesture) and zooming (e.g., by tilting the device or sliding a finger or other appropriate gesture), the user may remove his or her finger from the surface of the display 102. The device may then return to its normal input mode, so that tilting of the device no longer results in zooming of the display 102. The new zoom level may then be set as a base level for subsequent zooming. For example, if it would have required the user to tilt the device 20 degrees to achieve two levels of zooming in the first instance, the user may achieve the same level of zooming by contacting the display 102 twice, and tipping it 10 degrees while maintaining contact both times.

Display 108 in FIG. 1B shows the result of the zooming that occurred from the user's interaction with display 102 in FIG. 1A. The display 108 can be seen to have zoomed out one or two levels (from the tilting of the device) and is centered on location 106 where the user contacted the display 102. In display 108, alternative or additional mechanisms for providing to the device an input to zoom or pan are shown in the form of icons 110, 112. Normally, the icons would have been visible in display 102, but are shown only in display 108 here so as to indicate how different signaling mechanisms may be employed in a system. Icon 110 is a zoom icon, as indicated by its "+/−" label, and when contacted by a user, causes the device to switch into a mode in which motion of the device may cause the device to zoom in and out on the display 108 shown on the device.

Icon 112 is a panning icon, whose selection by a user causes motion of the device to result in panning. Although the icon 112 is shown here as being contacted by an index finger of the user's hand 104, the icons are positioned here near a corner of the display 108 so that the user could easily contact them with a thumb when the user is holding the device in both their hands in a normal manner. Also, the icons 110, 112 are shown here for clarity in a size that is larger than they would normally be shown on display 108.

For panning, motion of the device may correspond to the virtual effect of sliding the device downhill on the graphical element, here the map. Thus, tilting the device forward will cause the device to pan upward, or North, on the map (or cause the map to slide downward within the viewport represented by the display 108). In this particular example, the bracketed levels of [Down] and [Up] adjacent to the device indicate that the user has tilted the device downward to the left (i.e., pushed their left hand toward the ground relative to their right hand) while holding down on the pan icon 112. Actual labels could also be shown on the display 108 to provide the user with an indication of the ability to pan or perform other actions by moving the device (e.g., by tilting, moving it laterally, or moving it vertically up and down, where the effect of lateral or update and down movement may vary depending on the degree of tilt of the device). As a result, the next display, which is display 116 of FIG. 1C, shows the area to the left (West) of the area shown on display 108 (as can be seen by the target pin "A" moving East, or to the right). The user may then remove his or her finger from contacting the display 116, and move on with the next part of their navigation, or may conduct more manipulation of the map. For example, the user could press the zoom icon 110 and then tip the device backward to zoom in on the center of the display 116 (e.g., near the intersection of Sand Piper Trail and Orchard Lane).

Other manipulations of the displays 102, 108, 116 may also be accomplished using motion of the device. For example, where the device is inclined slightly, rotation of the device about an imaginary line that extends perpendicularly out of the screen of the device may be linked to changes in orientation of the entity on the display, i.e., may cause the entity to rotate on the screen. The user's pressing on the display may be analogized to a "pinning" by the user of the item, so that it moves with the device as the device is rotated, and the user's release on the display may be seen as an "unpinning" so that the image maintains its orientation with respect to the ground outside the device when the device is subsequently rotated. The opposite effect may also be employed, where contact would represent unpinning (i.e. a disconnect between the device and the image) and lack of contact would be pinning. Although this is counterintuitive from a "pinning" perspective, it may be a superior user interaction, since images typically rotate with a device when the user is not actively contacting the device's display (i.e., when they are unpinned).

Also, other mechanisms may be used for inducing such motion-based interactions. For example, a user may touch one of a number of hardware buttons provided on a device or on softkeys provided along the edge of a display. In addition, the user may contact a menu button or similar generic button that is provided on the display itself. The user may also make a gesture on the screen or may move the device in a particular manner in order to induce the device to begin accepting the sorts of motion-based inputs discussed above.

A device may also provide audible or tactile feedback to a user in cooperation with motion-based input, reflecting the manner in which the device has interpreted the input. For example, the device may vibrate slightly each time it displays an additional zoom level, so that the user, while tilting the device more and more, may readily halt his or her tilting in response to feeling the vibration, and may check to see whether the newly-registered zoom level is the desired zoom level. Alternatively, or in addition, the device may provide an audible level of feedback, such as by stating "zoom level 4" or a similar message.

Figure 2:
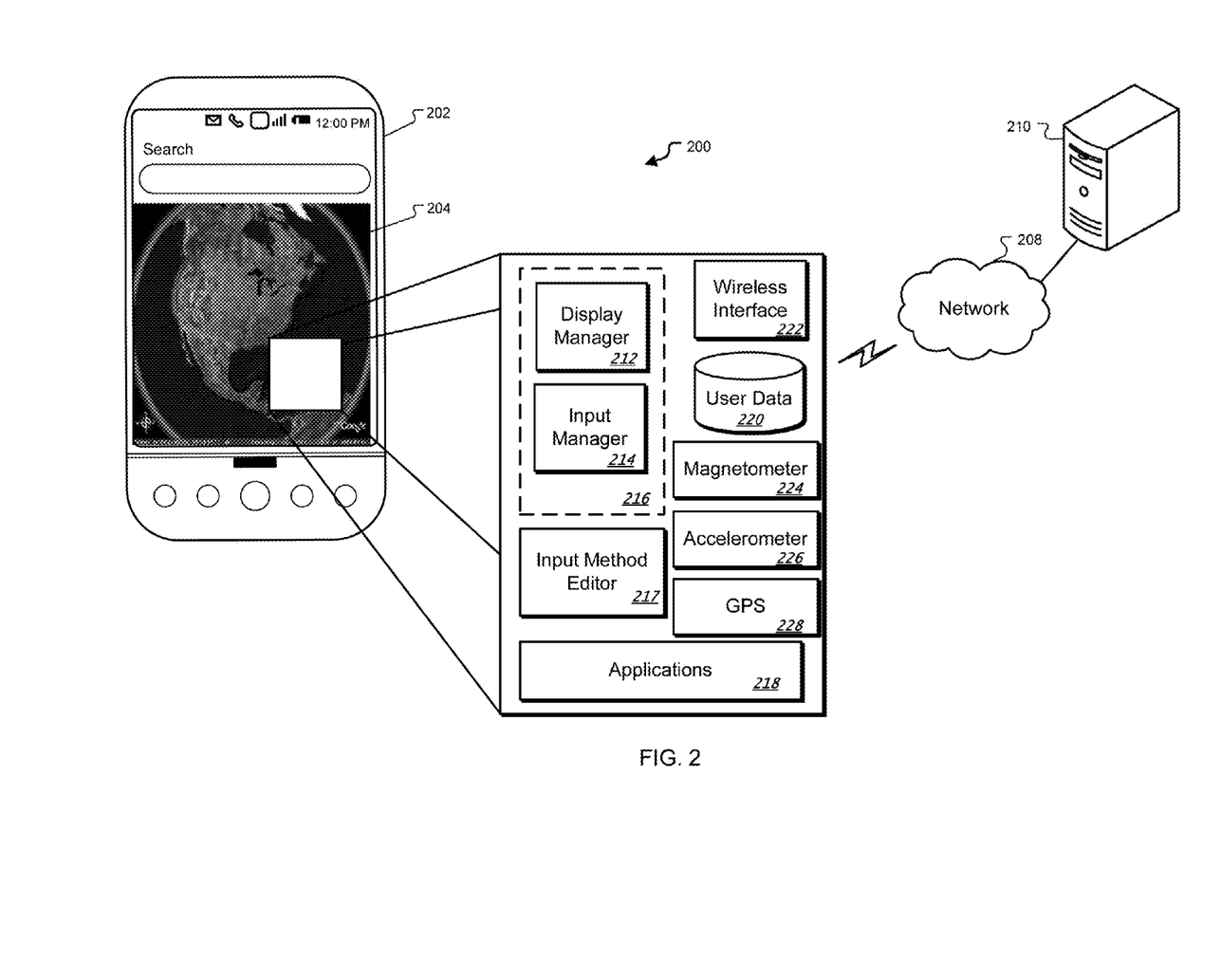
FIG. 2 is a block diagram of a system for providing a graphical display that changes in response to motion-based user input.

FIG. 2 is a block diagram of a system 200 for providing a graphical display that changes in response to motion-based user input. In general, the system is represented by a mobile device 202, such as a smart phone, that has a touchscreen user interface 204. In addition, the device 202 may have alternative input mechanisms, such as a clickable trackball 206 and other selectable buttons, in addition to a physical keyboard that can be uncovered by sliding the display outward, or a virtual keyboard that can be shown in the touchscreen display.

The device 202 may communicate via a wireless interface 222, through a network 208 such as the internet and/or a cellular network, with servers 210. For example, the device 202 may carry telephone calls through the telephone network or using VOIP technologies in familiar manners. Also, the device 202 may transmit regular (non-voice) data over the internet, such as in the form of HTTP requests directed at particular web sites, and may receive responses, such as in the form of mark-up code for generating web pages, scripting code such as JavaScript, media files, electronic messages, or in other forms. Particular techniques for communicating voice and data between mobile devices and central services are well known, and particular techniques are not critical here.

The form of interaction that a user has with the device may take a wide variety of forms, using, for example, applications that may be shipped with the device 202 when it is purchased, and applications that a user can purchase after-the-fact, such as from an on-line application store. This specification generally focuses on graphical objects that are substantially larger than the display area of the device 202, so that a user may have to perform various visual manipulations on the objects in order to view them properly. The manipulations are typical, and include zooming, panning, and changing the orientation of an item (rotating the item about an imaginary line that extends perpendicularly from the front of the screen). Particular items, or visual objects, may be presented in two dimensions or three dimensions.

A number of components running on one or more processors in the device 202 may give a user the option to provide motion-based input on the device 202, such as to zoom in and out on a graphical item shown on the display. For example, an interface manager 216 may manage interaction with the touchscreen interface 204, and may include a display manager 212 and an input manager 214.

The display manager 212 may manage what information is output—i.e., what is shown to a user via interface 204. For example, an operating system on the device 202 may employ display manager 212 to arbitrate access to the interface 202 for a number of applications 218 that are running on the device 202. In one example, the device 202 may display a number of applications, each in its own window, and the display manager 212 may control what portions of each application are shown on the interface 202 and which are hidden.

The input manager 214 may control inputs—e.g., data that is received from a user via the touchscreen 204 or other input mechanisms. For example, the input manager 214 may coordinate with the display manager 212 to identify where, on the display, a user is currently entering information so that that the device may understand the context of the input. For example, coordination may be formed between an absolute location on the display that a user touches, and an underlying location on an item that is shown on the display. In addition, the input manager 214 may determine which application or applications should be provided with the input. For example, when the input is provided within a text entry box of an active application, data entered in the box may be made available to that application. Likewise, applications may subscribe with the input manager so that they may be passed information entered by a user in appropriate circumstances. In one example, the input manager 214 may be programmed with an alternative input mechanism like those shown in FIG. 1 and may manage which application or applications are to receive information from the mechanism.

An input method editor (IME) 217 may communicate with the input manager 214 to help manager the flow of information being input on the device 202. In particular, the IME 217 may serve as a generic interface through which applications may obtain information that a user enters into the device 202 in a convenient manner. The IME 217 in general serves as a translator of inputs on behalf of the applications. For example, the IME 217 may generate and manage the display of a virtual keyboard on the display, and may interpret contacts on that keyboard into characters that may be passed to whatever application is the focus of the device 202 when the IME 217 is invoked. The IME 217 may also provide for language translation for applications 218. For example, an email application could permit an English-speaking user to send messages in Spanish by allowing the user to enter messages in English, and then receiving the Spanish-language equivalent back from the IME, and simply dropping the equivalent into the body of an email—as if that text had come directly to the application from the keyboard. IME's are also frequently employed to present an interface by which users can enter Roman-based characters in Pinyin, and may receive aids in converting the Pinyin to character-based Chinese representations, or other character-based languages.

The IME 217 may also provide translation of inputs from other input mechanisms on the device, including from magnetometer 224, accelerometer 226, and GPS module 228. Each of these sensors may include a base sensor itself, along with hardware, firmware, and software needed to provide an appropriate input that the system can handle. For example, the GPS module 228 may return lat/long coordinates; the magnetometer a direction in terms of degrees, minutes, and second from magnetic north; and the accelerometer 226 a figure that is expressed in G's, or in degree of tilt for the device 202 when the device 202 is relatively stationary.

Applications 218 may initially register with the IME 217 when they are originally launched. In certain embodiments, the applications 218 may identify one or more services offered by the device 202 to which they would like to subscribe (e.g., access to certain input mechanisms, or to notifications about incoming messages such as email or voice calls). When the particular application is the focus of the device 202, the IME 217 may sit between the various input mechanisms and the application, and may pass characters or other appropriate input to the applications. For example, a device that includes both a D-pad input mechanism and an accelerometer may pass motion-based input to applications as if the input was simply one or more presses on a D-pad directional arrow (with larger levels of tilt corresponding to larger numbers of key presses).

The IME 217 may then interact with the interface manager 216, such as by registering itself with the interface manager 216. When a user performs activities associated with such a registration, so as to indicate that the user would like to use the input mechanisms described here (e.g., by placing the device 202 in a pocket, by shaking the device 202 in a particular manner, by dragging across display 204 in a particular manner, or contacting a particular icon on the device 202), the interface manager 216 may report subsequent inputs by the user to the IME 217. For example, the interface manager 216 may report the X and Y coordinates of a contact by the user with the display 204, each line traced by a user or of points along a curve or other pattern traced by the user. The interface manager 216 may also report if the user entered any taps and where those taps occurred on the display 204.

The IME 217 may then interpret such input and report it in an appropriate manner to the relevant application or applications 218. For example, the IME 217 may report a direction of a dragging input and the occurrence of any taps relevant in time to the dragging, and the application may interpret such data. Alternatively, the IME 217 may interpret the data in a greater manner, such as by correlating a certain dragging direction with a keystroke that was previously registered by the application as corresponding to the direction. The IME 217 may then pass the keystroke to the application.

Where the IME 217 receives and interprets information from sensors such as magnetometer 224, accelerometer 226, and GPS module 228, its role may be relatively similar. For example, the accelerometer 226 may provide an input regarding an angle of inclination of the device about an imaginary line drawn horizontally across the display 204 at the center of the device. The IME 217 may then pass that value on directly where the application is able to process it directly (as determined by the IME's 217 published API) or may be converted, such as by the IME 217 "telling" the application that the user pressed the "up" D-pad key when the accelerometer reports that the user tilted the device forward by 10 degrees. Other translations may also be performed where appropriate, so that the application may receive appropriate information in a proper format.

Finally, and referring again to device 202 in FIG. 2, a user data database 220 may store information about particular user preferences or parameters. For example, the database 220 may store an identifier of an application that is to receive input from the IME 216 in various contexts. The database 220 may also store user preferences, such as those indicating the sensitivity for motion-based input that the user prefers (e.g., each discrete variation corresponds to 5 degrees of tilt or 10 degrees of tilt), or the directions that the user prefers (e.g., one user may prefer that tilting the device 202 forward is interpreted as zooming in, while another may prefer that it is interpreted as zooming in).

Figure 3A:
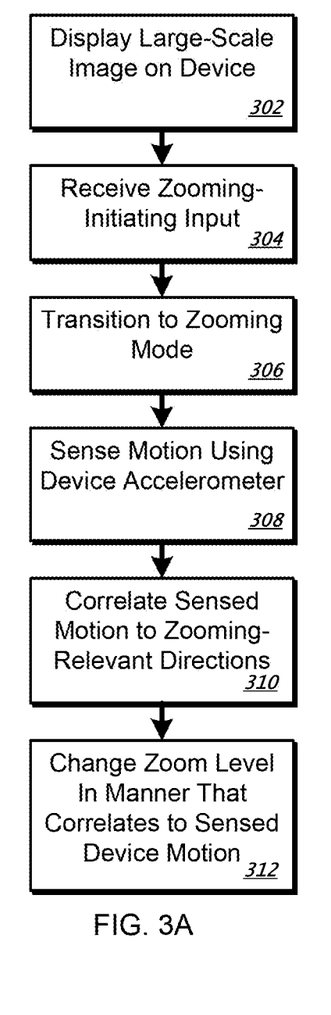
FIG. 3A is a flowchart of a process for motion-based user inputs on a mobile computing device.

FIG. 3A is a flowchart of a process for motion-based user inputs on a mobile computing device. In general, the process involves the use of a motion tracking program to determine the form of user inputs to a device, in combination with possible user inputs on a touchscreen display. The outputs of the interactions may be presented in the form of zooming, panning, and rotating an on-screen graphical item, such as a map or digital image.

At box 302, the process begins by a user displaying a large-scale image on a portable computing device, such as a smart phone. The image is referred to as being "large-scale" because it will not fit entirely on the screen of the device at a magnification level that the user will want to view it. Thus, it is an image that the user may want to manipulate, by panning, zooming in and out, and the like. Common large-scale images include digital photographs, drawings, and geographic maps. During this part of the process, the user may manipulate the image in various ways, and may bring up other or additional images. For example, a user may enter addresses into a query box for a mapping application, and may receive maps centered on corresponding search results in response.

At box 304, the process receives a zooming-initiating input from the user. Such an input indicates the user's intent to begin zooming on the image using motion of the device itself, where the display screen is built into the device in a standard manner for a smart phone device, so that all parts of the device rotate in unison. Shifting the device into a different state may cause certain motion-based user inputs to be activated or may cause manner in which they are interpreted to be changed. Thus, for example, it may be preferable most of the time not to have motion of a mobile device cause changes in an on-screen display, lest a user accidentally make changes and not understand why the changes are occurring. Thus, at box 306, the device changes into zooming mode, whereby motion inputs of the device are now interpreted for the user as inputs to change a zoom level of the image.

At box 308, the process begins monitoring inputs from the accelerometer (and may also monitor inputs from a magnetometer and other motion sensors). The particular inputs may relate to relative inclination of the device, which may be measured by an accelerometer because the physical motion-sensing elements of the accelerometer are subject to the earth's gravity. Generally, an accelerometer uses MEMS capacitive technology, where distances between two physical bodies are affected by sudden changes in motion or by gravity, and those distances change a capacitance between the bodies, where the capacitance can be measured and used to determine inclination and/or acceleration.

At box 310, the sensed motion or inclination is correlated to zooming relevant directions. For example, declination of the top edge of a device may correlate to zooming out, whereas inclination (relative to a bottom edge of the device) may correlate to zooming in. The degree of inclination and declination may also be reported, and be correlated to a speed or degree of zooming. Such correlations may be performed, for example, by an application in which the zooming occurs, by a particular interface, by a general input method editor, or in another appropriate manner.

At box 312, the zoom level is changed in a manner that corresponds to the sensed device motion. For example, an application that is displaying the image may zoom in by an amount that is proportional to the degree of tilt or other motion that a user applied to the device after the device changed to a zooming mode.

In this manner, a user can easily transition their device into the zooming mode, where their inputs may be of a type that they would not normally want translated into zooming inputs under normal conditions. The user can then quickly perform the zooming, and can transition easily out of the zooming mode. Such transition in and out of the zooming mode may be as simple as the user contacting an icon on a touchscreen, holding the icon down while they want to be in the zooming mode, and releasing the icon when they want to be back out of the zooming mode.

Figure 3B:
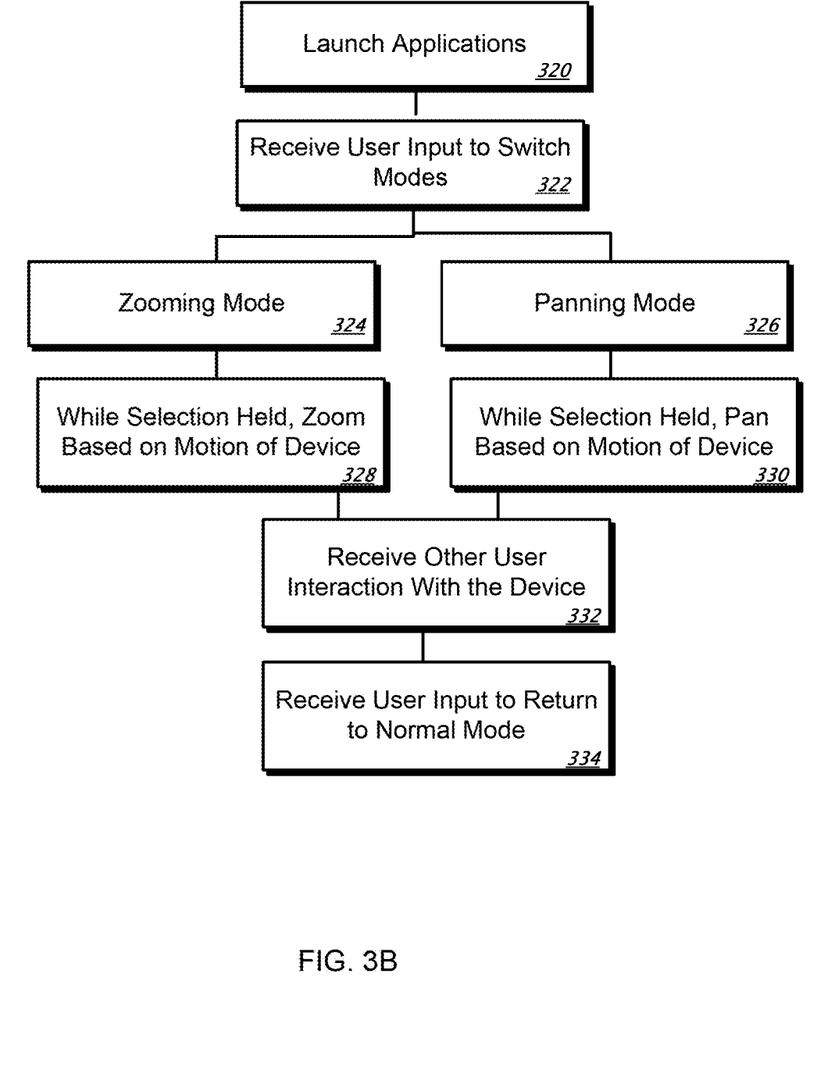
FIG. 3B shows a process for receiving multiple types of motion-based input on a mobile device.

FIG. 3B shows a process for receiving multiple types of motion-based input on a mobile device. In general, the process is similar to that shown in FIG. 3A, but provides for motion-based inputs that are translated as actions other than simple zooming.

The process begins at box 320, where an application for displaying a large-scale graphical item is launched. The application may be any sort of application by which items need to be handled that will not fit on a screen of a mobile device at a desired zoom level. The user may interact with the application in various ways, such as by opening different items to view (e.g., with a photo viewing application), submitting search terms (e.g., with a maps application), or in other ways. At box 322, the user submits an input suggesting that they want to switch input modes. In this example, there are two distinct modes that the user may select—a zooming mode 324 and a panning mode 326. The modes refer to the sort of interaction that will occur in response to general user motion of the device, such as tilting of the device. The user may select a mode in various ways, such as by selecting a zooming icon or panning icon, like icons 110, 112 in FIG. 1B, and long pressing on them (i.e., holding them down for a period of time that is determined by the device to exceed a time threshold for simple tapping inputs).

At boxes 328 and 330 of the process, the interface of the process either zooms or pans, depending on the mode, in response to motion of the device. Such zooming or panning may be influenced by overall motion of the device in the user's hands, such as by shocking or jerking motions of the device or tilting motion of the device, either to the right or left, or forward and back. Tiling may also occur in a combination of directions, such as by dipping the upper right corner of a device to pan to the Northeast on a map.

At box 332, other user interactions with the device are received. In particular, non-zooming or non-panning input may be received form the user even when the device is in a zooming or panning mode—in this example, putting the device in zooming or panning mode simply activates motion-based use of those modes but does not take away other user interactions that would otherwise be available on a device.

At box 334, the device receives user input to return to a normal mode of interaction with the device, which will cause the application on which the user is focused to stop receiving motion-based input from the device. For example, the user may return to the normal mode by relieving pressure from a button on the device, including on an icon on the display of the device. In this manner, the user may easily shift in and out of modes in which the active application is responsive to motion-based input.

In certain embodiments, a short press on an icon and a long press on the icon may be interpreted differently. For example, a short press (a tap) on zooming icon may cause the display to zoom in or out, as appropriate, a single level. A long press, followed by motion of the device while the icon is still being pressed, may be interpreted differently—as involving zooming in a "direction" of the tilting or other motion, and to an amount proportional to the amount of motion. In this, manner, a user can conveniently choose between modes of zooming conveniently.

In certain situations, modes may be mixed and both may be provided via motion input at the same time. For example, if a user is viewing a list of songs in a music library, the user may pan up and down the list of sings by tipping his or her device forward or backward, and may zoom in or out (e.g., switching between displaying only the letters of the alphabet in one view, and the list of every song in a zoomed-in view) by tipping his or her device left or right. Such mixture may be particularly appropriate where the large-scale item has one dimension, so that panning is in two directions only rather than four or more (e.g., in all directions in two dimensions).

Figure 4:
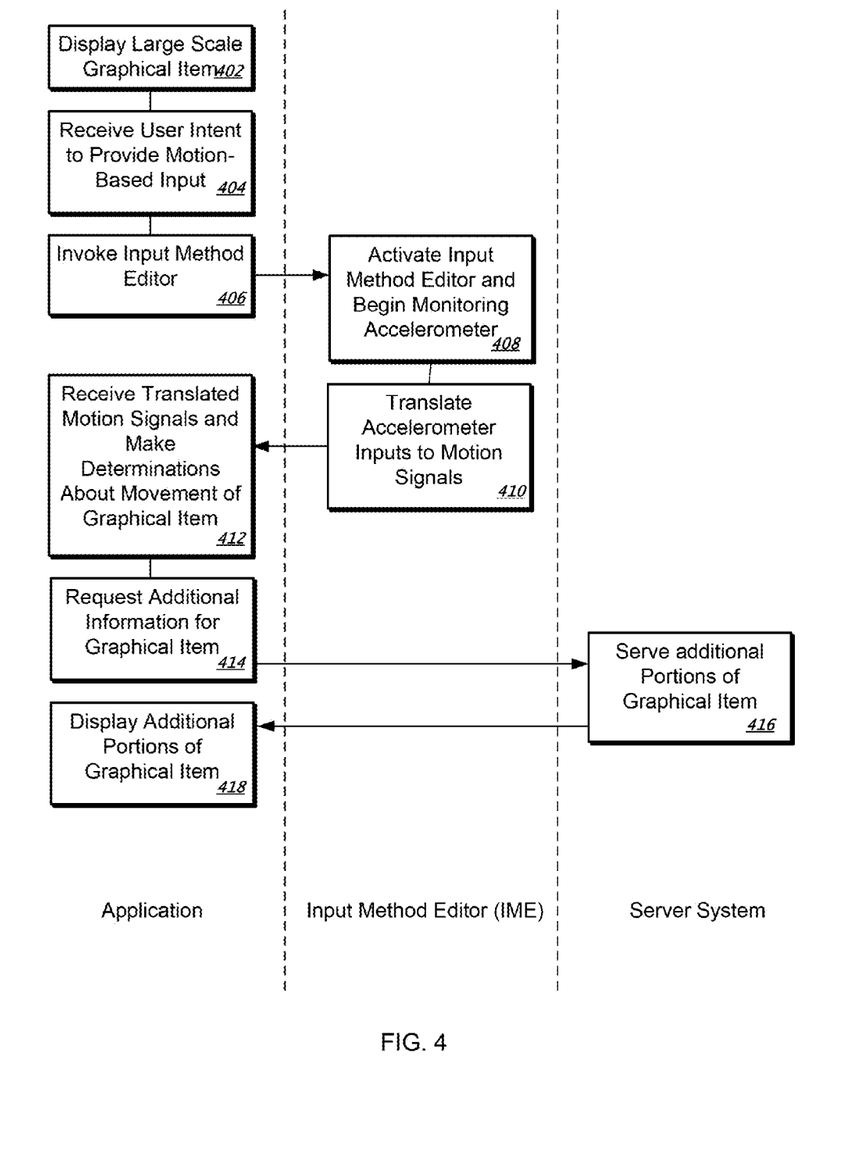
FIG. 4 is a swim lane diagram of a process by which motion-based user input may be interpreted by a computer system.

FIG. 4 is a swim lane diagram of a process by which motion-based user input may be interpreted by a computer system. In general, the process is shown here to highlight one example by which various components of a larger system may execute in cooperation with each other to receive motion-based user inputs, and may respond accordingly to provide the user with intuitive feedback to such inputs.

The process begins at box 402, where a large-scale graphical item is displayed by an application that is executing on a mobile device. At box 404, the user provides an intent to provide motion-based input to the device. For example, the user may shake the device in a particular manner, or may press and hold an icon (e.g., a zooming or panning icon) on a touchscreen display of the device in order to indicate such an intent.

In this example, such an input causes the application to invoke an IME that resides on the device, and the IME activates and begins monitoring motion-sensing devices on the mobile device (box 408). Such invocation may occur by the application passing to the IME a parameter indicating that the application would like to receive information regarding the motion of the device as an input. Thus, for example, the IME may begin monitoring the device accelerometer and magnetometer, but may not display a virtual keyboard, as the IME would normally do.

At box 410, the IME translates accelerometer and perhaps other inputs for the application and passes the translated information to the application. For example, the IME may take "core" accelerometer data from the accelerometer or main processor of the device and translate it into a value that corresponds to one or more directional key presses on a keypad such as a D-pad.

At box 412, the application receives the translated motion signals and makes determinations about movement of the graphical item that are designed to correspond to the inputs. For example, if the IME reports that two "left" key presses were received, the application may zoom in two levels on the image, or may pan to the left on the image by two predetermined amounts.

In certain situations, such motion may cause the image to run off the edge of the viewport, and may require the application to obtain additional information, such as from a remote server, in order to display the image in an appropriate manner once again. Thus, at box 414, the application requests additional information for the graphical item. For example, the application may request from the remote server that additional map tiles be provided so that the application may fill them in appropriately. At box 416, the remote server system provides the requested tiles, and at box 418, the application displays them in a conventional manner.

Thus, by this process also, a user can easily interact with a mapping application to move within a map using motion of their mobile device. Such interaction may be relatively seamless where the application automatically fetches additional information about the graphical item that is being displayed, as the user's interaction with the item requires that such additional information be obtained.

Figure 5:
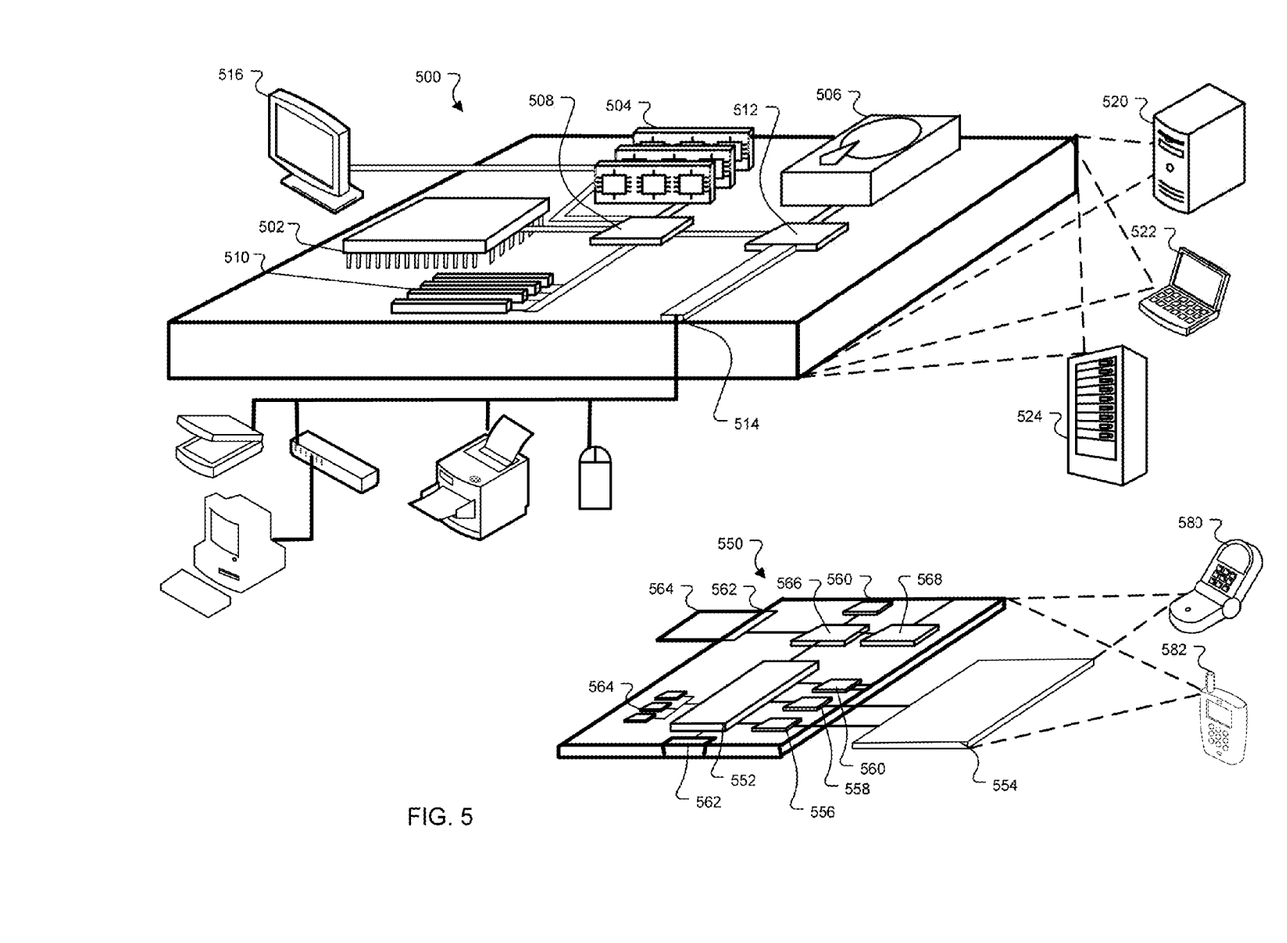
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to a telephone dialing application, but other forms of applications and keypad layouts may also be addressed, such as keypads involving graphical icons and macros, in addition to alphanumeric characters.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented user interface method, comprising:
    displaying an image on a graphical user interface of a mobile computing device;
    receiving a first user input on a touchscreen of the mobile computing device;
    sensing motion of the mobile computing device in one or more of a plurality of directions, wherein the sensed motion comprises a sensed tilting of the mobile computing device about an axis of the mobile computing device;
    determining whether to interpret the sensed motion as indicating a zooming input based on the first user input, wherein the sensed motion is interpreted as indicating a zooming input when the user is determined to have been contacting the touchscreen while the sensed motion was detected by the mobile computing device;

based on the determination of whether to interpret the sensed motion as indicating a zooming input, correlating the sensed motion with either a zooming in or a zooming out zooming direction;

determining a tilt angle of the mobile computing device;

identifying the tilt angle as being within a particular tilt angle range from among a plurality of tilt angle ranges, wherein each respective tilt angle range from among a plurality of tilt angle ranges, wherein each respective tilt angle range from among the plurality of tilt angle ranges is associated with a distinct zoom level of a plurality of zoom levels;

identifying a particular zoom level of the plurality of zoom levels as being associated with the particular tilt angle range; and changing a display of the image on the graphical user interface to correspond to the particular zoom level in the correlated zooming direction.

2. The method of claim 1, wherein the motion is sensed by using an accelerometer in the mobile computing device.

3. The method of claim 1, further comprising providing on the touchscreen a zooming icon, and wherein receiving a user input indicating an intent to perform a zooming function comprises receiving a user selection of the zooming icon.

4. The method of claim 1, wherein the image comprises a geographical map.

5. The method of claim 1, wherein the image comprises a rendered web page.

6. The method of claim 1, wherein the image comprises a digital image displayed in an image viewing application executing on the mobile computing device.

7. The method of claim 1, wherein, when the sensed motion is correlated with the zooming in direction, the zoom level of the display is increased and is centered based on a location on the touchscreen at which the user touched the touchscreen.

8. The method of claim 1, further comprising:
receiving an indication that a user of the mobile computing device has stopped touching the touchscreen of the mobile computing device; and
in response to receiving the indication, removing the correlation of the sensed motion with either the zooming in or the zooming out zooming direction, wherein removing the correlation causes the zoom level of the display to stop being changed.

9. The method of claim 1, further comprising:
based on the determination of whether to interpret the sensed motion as indicating a zooming input, displaying a first label positioned near an edge of the graphical user interface and a second label positioned near an opposite edge of the graphical user interface, wherein the first label indicates that motion of the mobile computing device in a direction toward the edge of the graphical user interface will cause a zoom in operation to be performed, and wherein the second label indicates that motion of the mobile computing device in an opposite direction toward the opposite edge of the graphical user interface will cause a zoom out operation to be performed.

10. A computer-implemented user interface method, comprising:
displaying an image on a graphical user interface of a mobile computing device;

receiving a first user input on a touchscreen of the mobile computing device that indicates that a user of the mobile computing device has contacted the touchscreen;

sensing motion of the mobile computing device in one or more of a plurality of directions;

determining whether to interpret the sensed motion as indicating a zooming input based on the first user input, wherein the sensed motion is interpreted as indicating a zooming input when the user is determined to have been contacting the touchscreen while the sensed motion was detected by the mobile computing device;

based on the determination of whether to interpret the sensed motion as indicating a zooming input, correlating the sensed motion in one or more of a plurality of directions with either a zooming in or a zooming out zooming direction;

changing a zoom level of the display of the image on the graphical user interface to correspond to the correlated zooming direction;

while changing the zoom level of the display, receiving a second user input that indicates an intent to perform a panning operation on the graphical user interface, wherein the second user input comprises a dragging input defined by a user maintaining contact with the touchscreen while moving a point of contact on the touchscreen;

correlating motion of the dragging input with one or more panning directions; and panning the content in a direction of the one or more correlated panning directions;

wherein the image comprises a list of files, sensed tilting of the device in a direction that is aligned with the list causes the list to scroll, and sensed motion of the device in a direction that is not aligned with the list causes the list to zoom.

11. The method of claim 10, wherein zooming of the list comprises shifting from a listing of single alphanumeric characters to a listing of each item in the list in an alphanumeric order.

12. A computer-implemented user interface method, comprising:
displaying an image on a graphical user interface of a mobile computing device;

receiving a first user input on a touchscreen of the mobile computing device that indicates that a user of the mobile computing device has contacted the touchscreen;

sensing motion of the mobile computing device in one or more of a plurality of directions;

determining whether to interpret the sensed motion as indicating a zooming input based on the first user input, wherein the sensed motion is interpreted as indicating a zooming input when the user is determined to have been contacting the touchscreen while the sensed motion was detected by the mobile computing device;

based on the determination of whether to interpret the sensed motion as indicating a zooming input, correlating the sensed motion in one or more of a plurality of directions with either a zooming in or a zooming out zooming direction;

changing a zoom level of the display of the image on the graphical user interface to correspond to the correlated zooming direction;

while changing the zoom level of the display, receiving a second user input that indicates an intent to perform a panning operation on the graphical user interface, wherein the second user input comprises a dragging input defined by a user maintaining contact with the touchscreen while moving a point of contact on the touchscreen;

correlating motion of the dragging input with one or more panning directions; and panning the content in a direction of the one or more correlated panning directions;

wherein the sensed motion comprises lateral motion of the mobile computing device and the zooming occurs in a direction that corresponds to a direction of the lateral motion.

13. An article comprising a non-transitory computer-readable data storage medium storing program code that is operable to cause one or more machines to perform operations, the operations comprising:

displaying an image on a graphical user interface of a mobile computing device;

receiving a first user input on a touchscreen of the mobile computing device;

sensing motion of the mobile computing device in one or more of a plurality of directions, wherein the sensed motion comprises a sensed tilting of the mobile computing device about an axis of the mobile computing device;

determining whether to interpret the sensed motion as indicating a zooming input based on the first user input, wherein the sensed motion is interpreted as indicating a zooming input when the user is determined to have been contacting the touchscreen while the sensed motion was detected by the mobile computing device;

based on the determination of whether to interpret the sensed motion as indicating a zooming input, correlating the sensed motion with either a zooming in or a zooming out zooming direction;

determining a tilt angle of the mobile computing device;

identifying the tilt angle as being within a particular tilt angle range from among a plurality of tilt angle ranges, wherein each respective tilt angle range from among the plurality of tilt angle ranges is associated with a distinct zoom level of a plurality of zoom levels;

identifying a particular zoom level of the plurality of zoom levels as being associated with the particular tilt angle range; and changing a display of the image on the graphical user interface to correspond to the particular zoom level in the correlated zooming direction.

14. The article of claim 13, wherein the operations further comprise providing a zooming icon on the touchscreen, and wherein receiving a user input indicating an intent to perform a zooming function comprises receiving a user selection of the zooming icon.

15. The article of claim 13, wherein the image comprises a list of files, sensed tilting of the device in a direction that is aligned with the list causes the list to scroll, and sensed motion of the device in a direction that is not aligned with the list causes the list to zoom.

16. The article of claim 15, wherein zooming of the list comprises shifting from a listing of single alphanumeric characters to a listing of each item in the list in an alphanumeric order.

17. A mobile computing device, comprising:

a touch input manager to receive and interpret user inputs on a touch input device of a computing device, wherein the touch input manager is arranged to receive first user input that indicates that a user of the mobile computing device has contacted a touchscreen of the mobile computing device and a second user input comprising a dragging input defined by the user maintaining contact with the touchscreen while moving a point of contact on the touchscreen;

one or more sensors arranged to sense tilting motion of the mobile computing device about an axis of the mobile computing device;

one or more computing applications stored on the mobile computing device; and an input method editor programmed to:

receive information indicating that tilting motion of the mobile computing device was sensed by the one or more motion sensors;

determine whether to interpret the sensed tilting motion as indicating zooming input or other input based on the first user input on the touchscreen of the mobile computing device;

determine a tilt angle of the mobile computing device, identify the tilt angle as being within a particular tilt angle range from among a plurality of tilt angle ranges, wherein each respective tilt angle range from among the plurality of tilt angle ranges is associated with a distinct zoom level of a plurality of zoom levels;

identify a particular zoom level of the plurality of zoom levels as being associated with the particular tilt angle range; and provide data relating to the received information to a plurality of different applications that include the one or more applications if the sensed tilting motion is interpreted as indicating a zooming input, wherein the sensed tilting motion is interpreted as indicating a zooming input when the user is determined to have been contacting the touchscreen while the sensed tilting motion was detected by the mobile computing device, and wherein the one or more applications are programmed to convert the data from the input method editor into commands for changing a display of an image on the computing device to correspond to the particular zoom level.

18. The device of claim 17, further comprising an application programmed to obtain one or more applications from an in-line application store, wherein the obtained applications include interfaces for interacting with the input method editor.

19. A computer-implemented user interface method, comprising:

displaying an image on a graphical user interface of a mobile computing device;

receiving a first user input on a touchscreen of the mobile computing device that indicates that a user of the mobile computing device has contacted the touchscreen;

sensing motion of the mobile computing device in one or more of a plurality of directions;

determining whether to interpret the sensed motion as indicating a zooming input based on the first user input, wherein the sensed motion is interpreted as indicating a zooming input when the user is determined to have been contacting the touchscreen while the sensed motion was detected by the mobile computing device;

based on the determination of whether to interpret the sensed motion as indicating a zooming input, correlating the sensed motion in one or more of a plurality of directions with either a zooming in or a zooming out zooming direction;

changing a zoom level of the display of the image on the graphical user interface to correspond to the correlated zooming direction;

while changing the zoom level of the display, receiving a second user input that indicates an intent to perform a panning operation on the graphical user interface, wherein the second user input comprises a dragging input defined by a user maintaining contact with the touchscreen while moving a point of contact on the touchscreen;

correlating motion of the dragging input with one or more panning directions;

panning the content in a direction of the one or more correlated panning directions; and based on the determination of whether to interpret the sensed motion as indicating a zooming input, displaying a first label positioned near an edge of the graphical user interface and a second label positioned near an opposite edge of the graphical user interface, wherein the first label indicates that motion of the mobile computing device in a direction toward the edge of the graphical user interface will cause a zoom in operation to be performed, and wherein the second label indicates that motion of the mobile computing device in an opposite direction toward the opposite edge of the graphical user interface will cause a zoom out operation to be performed.

* * * * *